United States Patent
Bosset et al.

(10) Patent No.: US 11,825,219 B2
(45) Date of Patent: Nov. 21, 2023

(54) PIXEL MATRIX WITH RAPID REGROUPING

(71) Applicant: TRIXELL, Moirans (FR)

(72) Inventors: Bruno Bosset, Moirans (FR); Xavier Favre, Moirans (FR)

(73) Assignee: TRIXELL, Moirans (FR)

( * ) Notice: Subject to any disclaimer, the term of this patent is extended or adjusted under 35 U.S.C. 154(b) by 358 days.

(21) Appl. No.: 17/311,990

(22) PCT Filed: Dec. 17, 2019

(86) PCT No.: PCT/EP2019/085522
§ 371 (c)(1),
(2) Date: Jun. 8, 2021

(87) PCT Pub. No.: WO2020/127180
PCT Pub. Date: Jun. 25, 2020

(65) Prior Publication Data
US 2022/0014691 A1  Jan. 13, 2022

(30) Foreign Application Priority Data

Dec. 21, 2018 (FR) ...................................... 1873899

(51) Int. Cl.
*H04N 25/46* (2023.01)
*H04N 25/75* (2023.01)
*H04N 25/78* (2023.01)

(52) U.S. Cl.
CPC ............. *H04N 25/46* (2023.01); *H04N 25/75* (2023.01); *H04N 25/78* (2023.01)

(58) Field of Classification Search
CPC ........ H04N 25/46; H04N 25/75; H04N 25/78; H04N 25/767; H04N 25/779
See application file for complete search history.

(56) References Cited

U.S. PATENT DOCUMENTS

| 6,330,303 | B1 | 12/2001 | Yamane et al. |
| 11,159,757 | B2 * | 10/2021 | Uchida ................. H04N 25/75 |
| 2007/0075255 | A1 | 4/2007 | Xu |
| 2007/0229686 | A1 | 10/2007 | Hiyama et al. |

(Continued)

*Primary Examiner* — Albert H Cutler
(74) *Attorney, Agent, or Firm* — BakerHostetler (57) ABSTRACT

A matrix-array detector includes a set of pixels that are sensitive to a physical effect and arranged in a matrix array in at least one row and columns, each pixel generating a signal dependent on the physical effect, Q column conductors, each connecting the one or more pixels of one and the same column and intended to transport the signals generated by the pixels. The detector further comprises N multiplexers configured to operate simultaneously, each multiplexer receiving the signals from K column conductors, K being greater than or equal to 2, Q being at least equal to $K^2$. The columns and associated conductors are ordered according to their physical distribution, q representing a current column. The N multiplexers are ordered from 1 to Q/K, n representing the rank of the current multiplexer. The column of rank q, where q is between 1 and $K^2$, is connected to the multiplexer of rank n=q modulo K. Downstream of the multiplexers, the detector comprises a network of switches allowing signals present at the outputs of the multiplexers to be mixed.

5 Claims, 4 Drawing Sheets

(56) References Cited

U.S. PATENT DOCUMENTS

| | | | | |
|---|---|---|---|---|
| 2009/0147089 A1* | 6/2009 | Tonkikh | ................ | H04N 25/74 |
| | | | | 348/207.99 |
| 2010/0277623 A1* | 11/2010 | Tejada | ................ | H04N 25/583 |
| | | | | 348/241 |
| 2015/0009376 A1* | 1/2015 | Tsunai | ................ | H04N 25/134 |
| | | | | 348/308 |
| 2018/0115726 A1* | 4/2018 | Yoshimura | ............. | H04N 25/65 |

* cited by examiner

PIXEL MATRIX WITH RAPID REGROUPING

CROSS-REFERENCE TO RELATED APPLICATIONS

This application is a National Stage of International patent application PCT/EP2019/085522, filed on Dec. 17, 2019, which claims priority to foreign French patent application No. FR 1873899, filed on Dec. 21, 2018, the disclosures of which are incorporated by reference in their entirety.

FIELD OF THE INVENTION

The invention relates to a matrix-array detector. The invention can be employed for the image capture in a detector. This type of device comprises a large number of sensitive points referred to as pixels that are generally arranged in a matrix array or in a linear array.

BACKGROUND

The invention can be used in the production of visible images but is not limited to this field. It is for example possible to produce pressure or temperature maps or two-dimensional representations of chemical or electrical potentials. These maps or representations form images of physical quantities.

In a detector, a pixel represents the elementary sensitive element of the detector. Each pixel converts a physical effect to which it is subjected into an electrical signal. The electrical signals from the various pixels are collected in a matrix-array read phase then digitized so as to be able to be processed and stored to form an image. The pixels are formed by a zone sensitive to the physical effect and deliver a current of electric charges, for example. The physical effect may be electromagnetic radiation delivering a stream of photons and, consequently, the invention will be explained by means of this type of radiation and the charge current is dependent on the stream of photons received by the sensitive zone. Generalizing to any matrix-array detector is straightforward.

In an image detector, each pixel generally comprises a photosensitive element, or photodetector, which may for example be a photodiode, a photoresistor or a phototransistor. There are photosensitive matrices of large size which may have several millions of pixels arranged in rows and columns. Each pixel further comprises an electronic circuit consisting, for example, of switches, capacitors and resistors, downstream of which there is an actuator. The assembly consisting of the photosensitive element and the electronic circuit allows electric charges to be generated and collected. The electronic circuit generally allows the charge collected in each pixel to be reset after a charge transfer. The role of the actuator is to transfer or copy the charges collected by the circuit to a column conductor. This transfer is performed when the actuator receives the instruction to do so from a row conductor. The output of the actuator corresponds to the output of the pixel. The terms "row conductor" and "column conductor" are completely arbitrary. It is of course possible to switch these terms.

In this type of detector, a pixel operates in two phases: an image capture phase, in which the electronic circuit of the pixel accumulates the electric charges generated by the photosensitive element, and a read phase, in which the collected charges are transferred or copied to the column conductor by the actuator.

A matrix-array image detector comprises row conductors, each connecting the pixels of one and the same row, and column conductors, each connecting the pixels of one and the same column. The column conductors are connected to converter circuits that are generally arranged at the edge of the matrix array, which may be referred to as the "foot of the column". A linear-array detector can be considered to be a matrix-array detector comprising only a single row of pixels and therefore as many columns as it does pixels.

In the read phase, a read instruction is transmitted to all of the actuators of one and the same row of the matrix array and each of the pixels in this row is read by transferring its electrical information, charge, voltage, current, frequency, etc. to the column conductor with which it is associated.

Hereinbelow, the case will be described in which the electrical information is available in analog form in the pixels, in the form of quantities of charges stored on capacitors of the same value. Of course, the invention may be employed for any form of electrical information generated in each of the pixels, such as for example digital information.

It may be desirable to regroup multiple pixels in order to read them collectively. This regrouping, known by the name "binning" in the English-language literature, allows the signal-to-noise ratio of each element read to be improved. Another reason to regroup pixels is to improve the sensitivity of the detector. Regrouping pixels as they are read also allows the read speed of the detector to be improved and therefore allows the frequency of the images produced by the detector to be increased. Regrouping is performed to the detriment of spatial resolution, however.

If the information from each pixel is an electric charge, pixels can be regrouped by redistributing the charges of the pixels to be regrouped over a common capacitor, for example arranged in the converter circuit at the foot of the column.

Moreover, it is possible to reduce the number of converter circuits at the foot of the column by connecting multiple columns to one and the same converter circuit. In order to connect multiple column conductors to one and the same converter circuit, it is possible to employ multiplexers. Multiple adjacent column conductors are each connected to the various inputs of one and the same multiplexer. The output of the multiplexer is connected to a converter circuit, which is therefore common to multiple adjacent columns of pixels. The various columns of pixels connected to one and the same multiplexer are read in succession by the converter circuit. The employment of multiplexers allows the number of converter circuits to be divided by a factor of K equal to the number of inputs of the multiplexers, but slows down the read speed by the same factor of K, since the read operations are performed serially.

Information from adjacent pixels in one and the same row that belong to distinct columns is regrouped at the output of the converter circuits. When converter circuits are common to multiple columns of pixels, the regrouping of information is tricky to perform because the information from the pixels to be grouped from one and the same row does not arrive at the same time. It becomes very complicated to redistribute it over a common capacitor at the foot of the column without losing time or surface area.

The invention falls within the framework of the use of multiplexers allowing the number of converter circuits to be reduced. The invention aims to increase the read speed for a pixel matrix in which information from immediately adjacent pixels belonging to distinct columns is regrouped.

SUMMARY OF THE INVENTION

To this end, the subject of the invention is a matrix-array detector comprising:
- a set of pixels that are sensitive to a physical effect and arranged in a matrix array in at least one row and multiple columns, each pixel generating a signal dependent on the physical effect,
- Q column conductors, each connecting the one or more pixels of one and the same column and intended to transport the signals generated by the pixels, the columns and associated conductors being ordered according to their physical distribution, q representing a current column,
- N multiplexers, each multiplexer comprising K inputs ordered from 1 to K, k representing the rank of the current input, each input receiving signals from one of the column conductors, K being greater than or equal to 2, Q being at least equal to K2, the multiplexers being ordered from 1 to Q/K, n representing the rank of the current multiplexer, each multiplexer comprising an output, the N multiplexers sequentially delivering to their output the signals received in the order of their inputs, the N multiplexers being configured to simultaneously deliver the signals received from inputs of the same rank k,
- a network of switches allowing signals present at the outputs of the multiplexers to be mixed, so as to regroup the signals from immediately adjacent pixels belonging to distinct columns, wherein:
- the column of rank q, where q is between 1 and K2, is connected to the multiplexer of rank n=q modulo K,
- the column of rank q, where q is between 1 and K2, is connected to the input of rank $k=\lfloor q-1 \rfloor/K\rfloor+1$.

Advantageously, Q is greater than $K^2$ and the connection of the first $K^2$ column conductors to K multiplexers and to the corresponding network of switches is replicated by subsets of $K^2$ column conductors and K multiplexers.

The network of switches is advantageously configured to produce groupings of submultiples of K or of K.

Advantageously, the detector further comprises N converter circuits, each associated with one of the multiplexers, each multiplexer delivering a multiplexed signal to the associated converter circuit.

The network of switches is advantageously arranged downstream of the converter circuits.

BRIEF DESCRIPTION OF THE DRAWINGS

The invention will be better understood and further advantages will become apparent upon reading the detailed description of one embodiment provided by way of example, which description is illustrated by the attached drawing, in which.

For the sake of clarity, the same elements will bear the same references in the various figures.

DETAILED DESCRIPTION

The description that follows is provided with reference to a matrix-array detector formed by multiple elementary electronic circuits referred to as pixels, each comprising an element that is sensitive to a physical quantity. The elementary electronic circuits are, in the example described, pixels that are sensitive to light radiation. Of course, the invention may be employed for other detectors sensitive to any form of physical quantity, allowing for example pressure or temperature maps to be produced.

Figure 1:
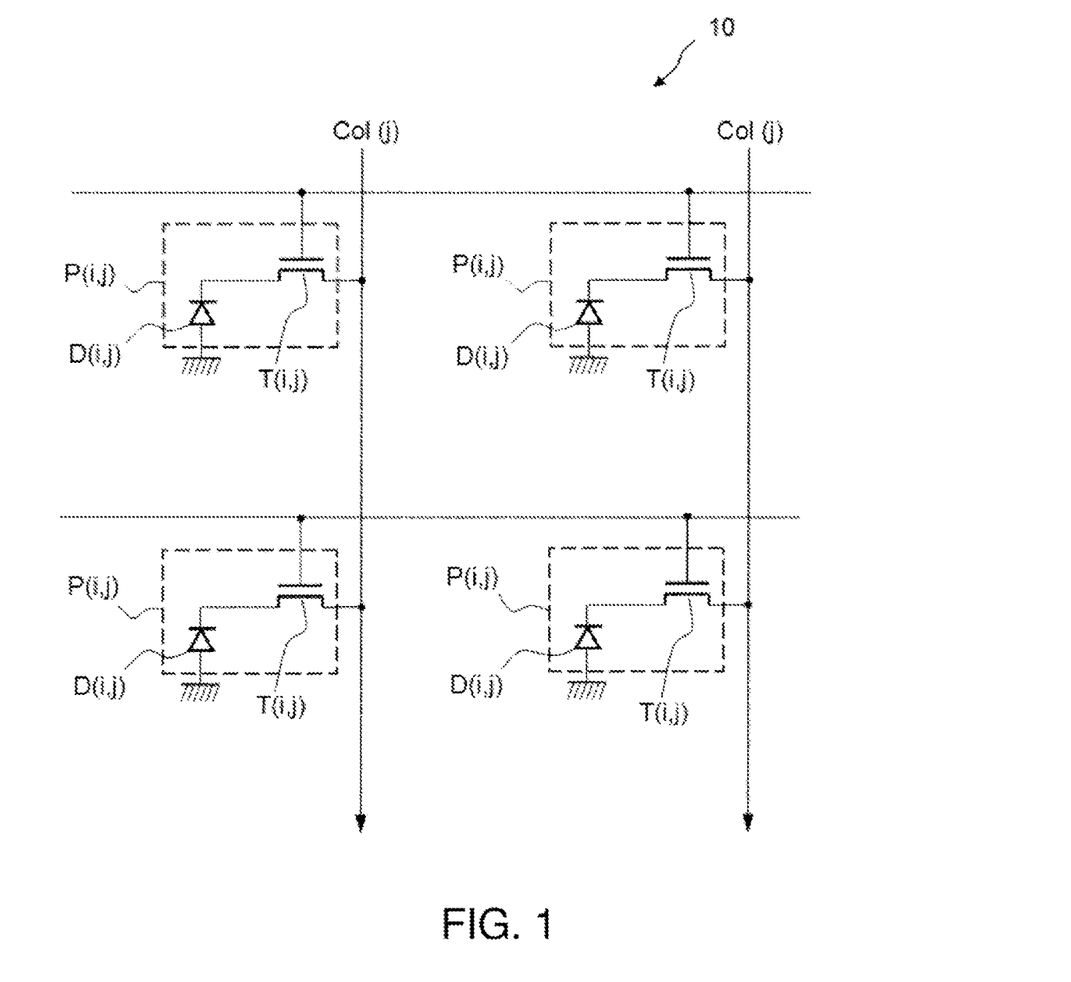
FIG. 1 shows an example of pixel matrices in which the invention can be employed.

FIG. 1 schematically shows a matrix comprising two rows and two columns to simplify understanding. Four pixels P are formed, each at the intersection of a row and a column. Of course, actual matrix arrays are generally much larger and have a large number of rows and columns. The matrix array is part of a matrix-array detector 10 allowing digitized images to be produced.

Each pixel P comprises a photosensitive zone, represented here by a photodiode D, and an electronic processing circuit formed, in the example of FIG. 1, by a single transistor T. The references for the components D and T are followed by two coordinates (i,j), which can take the rank of the row for i and the rank of the column for j. This pixel is also referred to as a pixel of 1T type because it has one transistor, the function of which will be described later on.

In general, it is known practice to produce pixel matrices comprising transistors employing complementary crystalline silicon semiconductors known in the English-language literature by their abbreviation CMOS (Complementary Metal Oxide Semiconductor). The invention is not limited to this type of transistor; it may be employed, for example, for matrix arrays comprising thin-film field-effect transistors known in the English-language literature by the name TFT (thin-film transistor). Transistors of TFT type may be metal-oxide-based, such as, for example, transistors based on amorphous or crystalline indium, gallium and zinc oxide, which are known by their English abbreviation IGZO. Other families of transistors of TFT type can be employed, such as, for example, organic TFTs, amorphous silicon TFTs, polycrystalline silicon TFTs, etc.

The pixels P of one and the same column are connected to a column conductor Col. This conductor allows information from the pixels connected thereto to be collected. The pixels P of one and the same row are connected to a row conductor carrying a signal Phi_ligne allowing each of the rows of pixels to be controlled.

In an image capture phase, which takes place after a reset operation, the illumination received by the photodiode D decreases the potential on its cathode. This image capture phase is followed by a read phase in which the potential of the photodiode D is read. To do this, the transistor T is turned on, which therefore acts as a switch, by virtue of the control Phi_ligne applied to its gate.

The column conductor Col is used to collect information from a pixel in the corresponding column when it is selected by the signal Phi_ligne. The invention is concerned with shaping information from the various column conductors Col.

It is also possible to implement the invention in a detector in which the pixels are simpler, in particular by replacing the transistor T with a simple diode which is turned on by the signal Phi_ligne.

Figure 2:
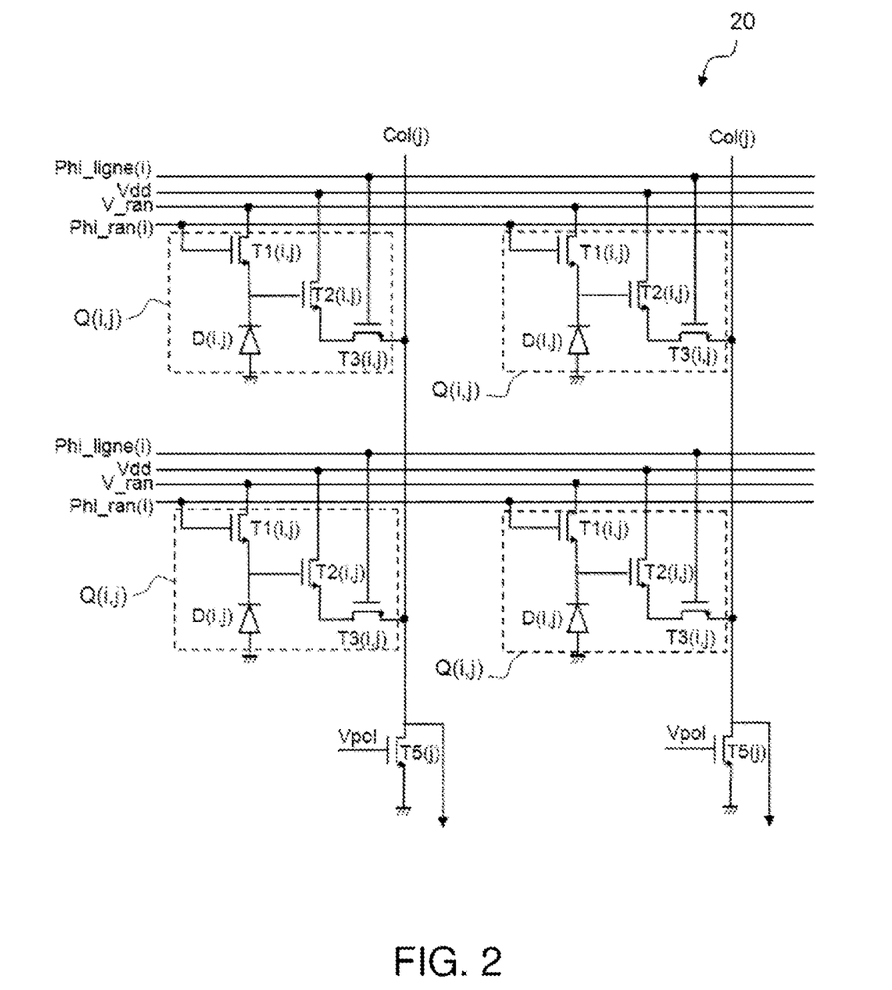
FIG. 2 shows another example of pixel matrices in which the invention can be employed.

FIG. 2 schematically shows another example of a matrix of pixels referenced Q that can also be put into an image detector according to the invention. Each pixel Q contains the photodiode D, and an electronic processing circuit formed here by three transistors T1, T2 and T3. As before, the references for the photodiode D and the three transistors are followed by two coordinates (i,j) which can take the rank of the row for i and the rank of the column for j. In practice, this type of pixel can comprise other components, in particular other transistors. This is the reason that this pixel is also referred to as a pixel of 3T type, because it has at least three transistors.

The pixels P in one and the same column share a transistor T5 situated at the end of the column conductor Col. The pixels P in one and the same row are connected to four row conductors that carry signals Phi_ligne, Vdd, V_ran and Phi_ran allowing each of the rows of pixels to be controlled.

The transistor T1 allows the voltage on the cathode of the photodiode D to be reset, to the voltage V_ran, during a reset operation for which the control signal Phi_ran is active.

In an image capture phase, which takes place after a reset operation, the illumination received by the photodiode D decreases the potential on its cathode. This image capture phase is followed by a read phase in which the potential of the photodiode D is read. To do this, the transistor T3 is turned on, which therefore acts as a switch, by virtue of the control Phi_ligne applied to its gate. The transistor T3 of the pixel of 3T type performs the same functional role as the transistor T of a pixel of 1T type described with reference to FIG. 1.

The transistor T2 operates as follower, and the transistor T5 operates as current source. The transistors T2 and T5 then form a voltage-follower stage which copies the voltage present on the cathode of the photodiode D, and reproduces it, to within a shift, on the column conductor Col. To perform its copying, the transistor T2 requires a bias current flowing in its drain and its source. This current is imposed by a current generator formed by a transistor T5 which may or may not be common to multiple pixels. In the example shown, the transistor T5 is common to a column of pixels. It is also possible to use only a single current source transistor T5, for the whole matrix array, on the condition that it is switched successively to the various columns, in tandem with the reading of these same columns. The column conductor Col is used both for biasing the transistor T2 and for collecting information from a pixel in the corresponding column when said pixel is selected by the signal Phi_ligne. Alternatively, it is possible to split the column conductor Col in order to separate its two functions.

The invention can be employed for pixels that operate differently. By way of example, the invention can be employed for pixels of 4T type. In addition to the transistors T1, T2 and T3, 4T pixels comprise an additional transistor arranged between the cathode of the photodiode D and the gate of the transistor T2 forming the node of the pixel. This additional transistor allows the charges accumulated in the photodiode D to be transferred to the node of the pixel at a chosen instant.

Addressing circuits, generally shift registers, generating the control signals Phi_ligne and Phi_ran, when employed, are not shown in FIGS. 1 and 2. Addressing circuits are arranged at the end of a row.

The terms row and column are completely arbitrary and could be switched. In terms of function, the detectors 10 and 20 comprise conductors referred to as row conductors that carry control signals for the various pixels and conductors referred to as column conductors that allow information gathered by the various pixels to be collected.

The description below is concerned with the use of the information carried by the column conductors. The invention can also be employed in a detector realized in the form of a linear array, that is to say comprising only a single row of pixels, the columns then comprising only a single pixel.

Figure 3:
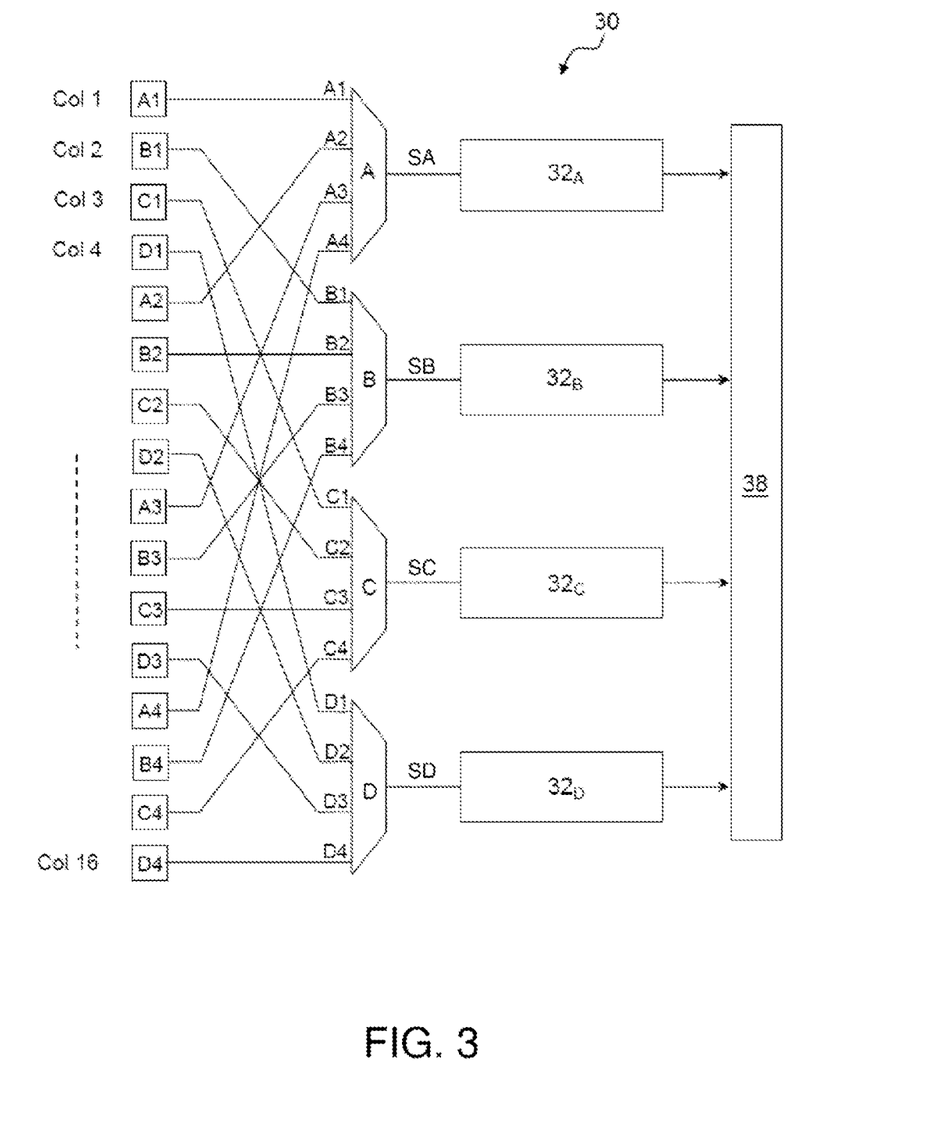
FIG. 3 shows an example of a read circuit associated with the matrices of FIG. 1.

FIG. 3 shows a read circuit 30 arranged at the foot of a column of the detector 10 or of the detector 20. The read circuit 30 is connected to all the column conductors Col. In the example shown, sixteen column conductors ordered from Col1 to Col16 are shown. Of course, the invention is not limited to a detector having sixteen columns of pixels and therefore sixteen column conductors. The spatial order of the conductors corresponds to that of the pixels in the matrix array. The pixel P(i, j) has the pixel P(i,j−1) and the pixel P(i,j+1) as immediate neighbors. The column conductor Col(j) therefore has firstly the column conductor Col(j−1) and secondly the column conductor Col(j+1) as immediate neighbors. The column conductors are ordered according to their physical distribution. The rank of the current column is denoted by q. q is a natural integer increasing in the physical order of the column conductors.

In the example shown, the read circuit 30 comprises four multiplexers A, B, C and D having four inputs each. Each of the inputs of the various multiplexers A, B, C and D is connected to one of the column conductors Col. Each multiplexer receives at each of its inputs a signal from one of the column conductors Col. More generally, each multiplexer has K inputs. Each multiplexer receives the signals from K column conductors Col, one signal per input, K being greater than or equal to 2. For a given multiplexer, the rank of the current input is denoted by k, k being a natural integer between 1 and K. If the detector comprises Q column conductors, Q is then equal to $K^2$ in the example in FIG. 3. It will be seen later on how to employ matrix arrays having a larger number of columns.

In the example shown, the inputs of each of the multiplexers are ordered from k=1 to k=4 or from A1 to A4 for the multiplexer A and likewise for the other multiplexers B, C and D. The first four columns Col1 to Col4 are respectively connected to the four first inputs of each of the four multiplexers. In other words, the column conductor Col1 is connected to the input A1, the column conductor Col2 is connected to the input B1, the column conductor Col3 is connected to the input C1 and the column conductor Col4 is connected to the input D1. The next four column conductors Col5 to Col8 are then respectively connected to the four second inputs of each of the four multiplexers. In other words, the column conductor Col5 is connected to the input A2, the column conductor Col6 is connected to the input B2, the column conductor Col7 is connected to the input C2 and the column conductor Col8 is connected to the input D2. The connection of the column conductors follows on in the same way until the conductor Col16 is connected to the input D4.

For the example of FIG. 3, the connection of the column conductors Col and the multiplexers can be summarized in the table below:

| Column conductor | | Multiplexer | | Input of the multiplexer | |
| --- | --- | --- | --- | --- | --- |
| Name | Rank q | Name | Rank n | Name | Rank k |
| Col1 | 1 | A | 1 | A1 | 1 |
| Col2 | 2 | B | 2 | B1 | 1 |
| Col3 | 3 | C | 3 | C1 | 1 |
| Col4 | 4 | D | 4 | D1 | 1 |
| Col5 | 5 | A | 1 | A2 | 2 |
| Col6 | 6 | B | 2 | B2 | 2 |
| Col7 | 7 | C | 3 | C2 | 2 |
| Col8 | 8 | D | 4 | D2 | 2 |
| Col9 | 9 | A | 1 | A3 | 3 |
| Col10 | 10 | B | 2 | B3 | 3 |
| Col11 | 11 | C | 3 | C3 | 3 |
| Col12 | 12 | D | 4 | D3 | 3 |
| Col13 | 13 | A | 1 | A4 | 4 |
| Col14 | 14 | B | 2 | B4 | 4 |
| Col15 | 15 | C | 3 | C4 | 4 |
| Col16 | 16 | D | 4 | D4 | 4 |

More generally, with N multiplexers having K inputs each, the multiplexers are ordered from 1 to Q/K, n representing the rank of the current multiplexer. When the rank of the column conductor is denoted by q, the column of rank q, where q is between 1 and $K^2$, is connected to the multiplexer of rank n=q modulo K. Moreover, the column of rank q, where q is between 1 and $K^2$, is connected to the input of rank k equal to the default integer portion of (q−1)/K with 1 added. In full mathematical notation:

$$k = \lfloor (q-1)/K \rfloor + 1$$

Using this method of connecting the column conductors to the multiplexers, two adjacent column conductors are not connected to one and the same multiplexer. It is thus possible to simultaneously process the information from two immediately adjacent columns. Regrouping performed downstream of the multiplexers is made easier thereby on account of the simultaneity in the processing of the information from immediately adjacent pixels belonging to distinct columns. Upstream and downstream are defined in the direction of transfer of the signals from the pixels.

In a read phase for a row of the detector 10, the signals from all the columns are presented more or less simultaneously at the various inputs of the multiplexers. Each multiplexer A, B, C and D sequentially delivers to its output SA, SB, SC and SD, respectively, the signals that it receives from each of its inputs and in the order of its inputs. For example, referring to FIG. 3, the multiplexer A delivers the signal from column Col1 received at its input A1, then the signal from column Col5 received at its input A2, then the signal from column Col9 received at its input A3 and finally the signal from column Col13 received at its input A4. The same goes for the other multiplexers B, C and D. As the four multiplexers operate simultaneously and advantageously in sync, the signal from column Col1 is found at the output of the multiplexer A, the signal from column Col2 is found at the output of the multiplexer B, the signal from column Col3 is found at the output of the multiplexer C and the signal from column Col4 is found at the output of the multiplexer D simultaneously. At the next instant, the signals from columns Col5, Col6, Col7 and Col8 are respectively found at the output of each of the multiplexers and so on for all the columns of the detector 10. In other words, the read circuit 30 is configured to simultaneously deliver the signals received from inputs of the same rank k.

The detector 10 can comprise a converter circuit downstream of each multiplexer. In other words, each multiplexer broadcasts a multiplexed signal to the converter circuit associated with it. There are as many converter circuits as there are multiplexers. In the detectors 10 and 20, there are Q/K converter circuits. The presence of the multiplexers allows the number of converter circuits to be reduced by a factor of Q/K. In the example of FIG. 3, the converter circuits are referenced 32 with the reference of the multiplexer that is associated with them as subscript.

Figure 4:
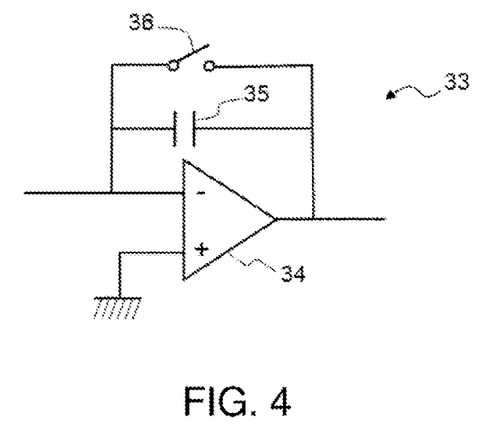
FIG. 4 shows an example of a converter circuit that can be employed in the read circuit of FIG. 3.

FIG. 4 provides an example of an analog converter circuit formed by an integrator 33. Each output of the multiplexers A to D is connected to an inverting input of an amplifier 37 connected as an integrator. An integrating capacitor 35 is connected between the inverting input and the output of the amplifier 37 forming the output of the converter circuit. The noninverting input of the amplifier 37 is connected to a reference potential, which, in the example shown, is an electrical ground. The converter circuit 33 comprises an electronic switch 36 connected in parallel with the integrating capacitor 35. The electronic switch 36 allows the converter circuit 33 to be reset. The converter circuit 33 allows the charges carried in the associated column conductors to be converted into voltage. Alternatively or additionally, the converter circuit can digitize the signals carried in the column conductors.

The read circuit 30 moreover comprises a network of switches 38 allowing signals from immediately adjacent pixels to be regrouped. An example of a network of switches 38 is provided in FIG. 5. The network of switches 38 is advantageously arranged downstream of the converter circuits when they are present. In the example shown in FIG. 3, where the multiplexers have four inputs each, the network of switches 38 is configured to regroup the signals from adjacent pixels in twos or in fours. More precisely, in order to regroup adjacent pixels, the network of switches 38 comprises three electronic switches 39, 40 and 41 and a control module 42 for the three switches 39, 40 and 41. The switch 39 allows the outputs of the multiplexers A and B to be connected to one another. A capacitor 43 can be connected to the output of the multiplexer A and a capacitor 44 can be connected to the output of the multiplexer B. By closing the switch 39, the capacitors 43 and 44 are then connected in parallel, which allows the signals present at the outputs of the multiplexers A and B to be averaged in order to mix them. The switch 41 likewise allows the outputs of the multiplexers C and D to be connected. A capacitor 45 can be connected to the output of the multiplexer C and a capacitor 46 can be connected to the output of the multiplexer D. Thus, at the first instant, firstly the grouping of columns Col1 and Col2 and secondly the grouping of columns Col3 and Col4 are found at the output of the network of switches 38. At the next instant, firstly the grouping of columns Col5 and Col6 and secondly the grouping of columns Col7 and Col8 are found at the output of the network of switches 38, and so on up until the fourth instant, where the multiplexers deliver the signals present at their respective fourth input.

Figure 5:
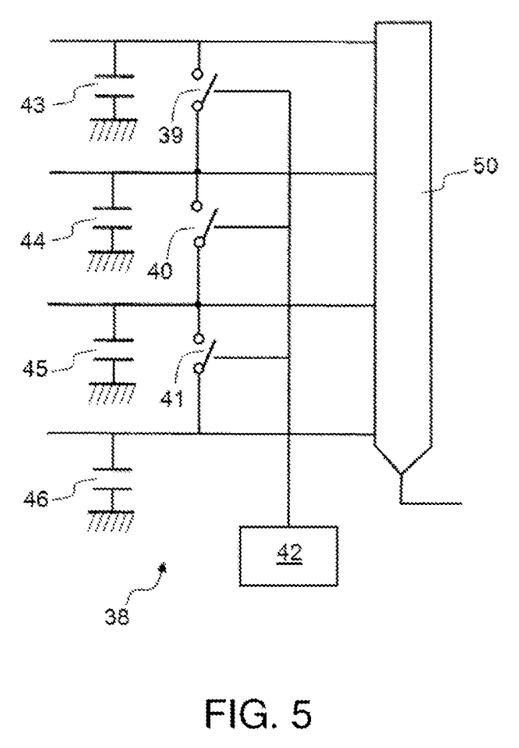
FIG. 5 shows an example of a network of switches that can be employed in the read circuit of FIG. 3.

The example of FIG. 5 allows averages to be produced between the signals from immediately adjacent columns. Other alternatives allowing the signals to be mixed are possible, such as, for example, adding the signals.

In the same way, in order to regroup immediately adjacent pixels in fours, the outputs of the multiplexers A, B, C and D are all connected. To this end, the switch 40 allows the outputs of the multiplexers B and C to be connected. The switch 40 is closed only with the switches 39 and 41. When the three switches 39 to 41 are closed, the four capacitors 43 to 46 are connected in parallel, which allows the signals present at the outputs of the four multiplexers A to D to be averaged. Thus, at the first instant, the grouping of columns Col1, Col2, Col3 and Col4 is found at the output of the network of switches 38, and so on up until the fourth instant, where the grouping of columns Col13, Col14, Col15 and Col16 is thus found at the output of the network of switches 38.

It is of course possible to produce no grouping by not closing any switch in the network of switches 38. The outputs of the network of switches 38 can be connected to a multiplexer 50 formed, for example, by a shift register having parallel inputs and a serial output in order to serially deliver the information collected in the detector to form an image. At the output of the multiplexer 50, the elementary information delivered serially can therefore be from each of the pixels taken in isolation or from a grouping of adjacent pixels according to the control from the network of switches 38.

In FIG. 3, the number of column conductors Q is equal to the number of inputs of each converter squared, i.e. $K^2$. This constitutes the foundation stone of the invention. To employ a greater number of columns of pixels and therefore a greater number of column conductors, this stone can be replicated for columns beyond $K^2$. More precisely, the connection of the first $K^2$ column conductors to K multiplexers and to the corresponding network of switches 38 is replicated by subsets of $K^2$ column conductors and K multiplexers.

FIG. 5 presents an example employing multiplexers having four inputs allowing groupings of two or four to be produced. More generally, it is possible to employ other multiplexers having a different number of inputs. For example, with twelve multiplexers having twelve inputs, it is possible to produce groupings of two, three, four, six and twelve immediately adjacent columns. More generally, by employing multiplexers having K inputs, it is possible to produce column groupings of all the submultiples of K and also a grouping of K columns.

As has been seen above, it is possible to produce a detector having a number of columns Q greater than $K^2$. In this case, the detector has as many networks of switches as it does groups of K multiplexers where the ranks n modulo K are between 1 and K.

The invention claimed is:

1. A matrix-array detector comprising:
    a set of pixels (P) that are sensitive to a physical effect and arranged in a matrix array in at least one row and multiple columns, each pixel (P) generating a signal dependent on the physical effect,
    Q column conductors (Col), each connecting the one or more pixels of one and the same column and intended to transport the signals generated by the pixels (P), the columns (Col) and associated conductors being ordered according to their physical distribution, q representing a current column,
    N multiplexers (A, B, C, D), each multiplexer comprising K inputs ordered from 1 to K, k representing the rank of the current input, each input receiving signals from one of the column conductors (Col), K being greater than or equal to 2, Q being at least equal to $K^2$, the N multiplexers (A, B, C, D) being ordered from 1 to Q/K, n representing the rank of the current multiplexer, each multiplexer (A, B, C, D) comprising an output (SA, SB, SC, SD), the N multiplexers (A, B, C, D) sequentially delivering to their output the signals received in the order of their inputs, the N multiplexers (A, B, C, D) being configured to simultaneously deliver the signals received from inputs of the same rank k,
    a network of switches allowing signals present at the outputs (SA, SB, SC, SD) of the multiplexers (A, B, C, D) to be mixed, so as to regroup the signals from immediately adjacent pixels belonging to distinct columns,
wherein:
    the column of rank q, where q is between 1 and $K^2$, is connected to the multiplexer of rank n=q modulo K,
    the column of rank q, where q is between 1 and $K^2$, is connected to the input of rank k equal to the default integer portion of (q−1)/K with 1 added, denoted by: $k=\lfloor(q-1)/K\rfloor+1$.

2. The detector as claimed in claim 1, wherein Q is greater than $K^2$ and wherein the connection of the first $K^2$ column conductors to K multiplexers and to the corresponding network of switches is replicated by subsets of $K^2$ column conductors and K multiplexers.

3. The detector as claimed in claim 1, wherein, the network of switches is configured to produce groupings of submultiples of K or of K.

4. The detector as claimed in claim 1, further comprising, N converter circuits, each associated with one of the multiplexers (A, B, C, D), each multiplexer (A, B, C, D) delivering a multiplexed signal to the associated converter circuit.

5. The detector as claimed in claim 4, wherein the network of switches is arranged downstream of the converter circuits.

* * * * *